United States Patent
Wiman et al.

(10) Patent No.: US 6,527,486 B2
(45) Date of Patent: Mar. 4, 2003

(54) CUTTING INSERT FOR DRILL

(75) Inventors: Jörgen Wiman, Sandviken (SE); Åke Sjölander, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/833,730

(22) Filed: Apr. 13, 2001

(65) Prior Publication Data

US 2001/0033779 A1 Oct. 25, 2001

Related U.S. Application Data

(63) Continuation-in-part of application No. PCT/SE99/01776, filed on Oct. 5, 1999.

(30) Foreign Application Priority Data

Oct. 13, 1998 (SE) ................................................ 9803477

(51) Int. Cl.⁷ .............................................. B32B 51/02
(52) U.S. Cl. ..................... 408/188; 407/113; 408/223; 408/713
(58) Field of Search .................... 407/113; 408/223, 408/224, 225, 713, 231, 233, 227, 230, 187, 188

(56) References Cited

U.S. PATENT DOCUMENTS

| 4,648,760 A | | 3/1987 | Karlsson et al. | |
| 4,940,369 A | * | 7/1990 | Aebi et al. ................... | 407/113 |
| 5,354,156 A | * | 10/1994 | von Haas et al. ............ | 408/223 |
| 5,503,509 A | | 4/1996 | von Haas et al. | |
| 5,622,461 A | | 4/1997 | Tukala et al. | |
| 5,718,542 A | * | 2/1998 | Basteck ....................... | 408/713 |
| 5,876,160 A | * | 3/1999 | Johnson ....................... | 407/113 |

FOREIGN PATENT DOCUMENTS

WO     WO98/07539     2/1998

\* cited by examiner

Primary Examiner—Daniel W. Howell
(74) Attorney, Agent, or Firm—Burns, Doane, Swecker & Mathis, LLP

(57) ABSTRACT

A cutting insert for a during includes a broken main cutting edge, the ends of which join respective additional edges of the insert by curved nose portions. Each curved nose portion forms a curved cutting edge defined by at least three sequentially arranged curved cutting edge segments defined by respective radii of different sizes. A first of the segments joins one end of the main cutting edge and has a first radius. The next segment has a radius of different length than the first radius and projects farther laterally than the first segment to perform a wiping function.

10 Claims, 4 Drawing Sheets

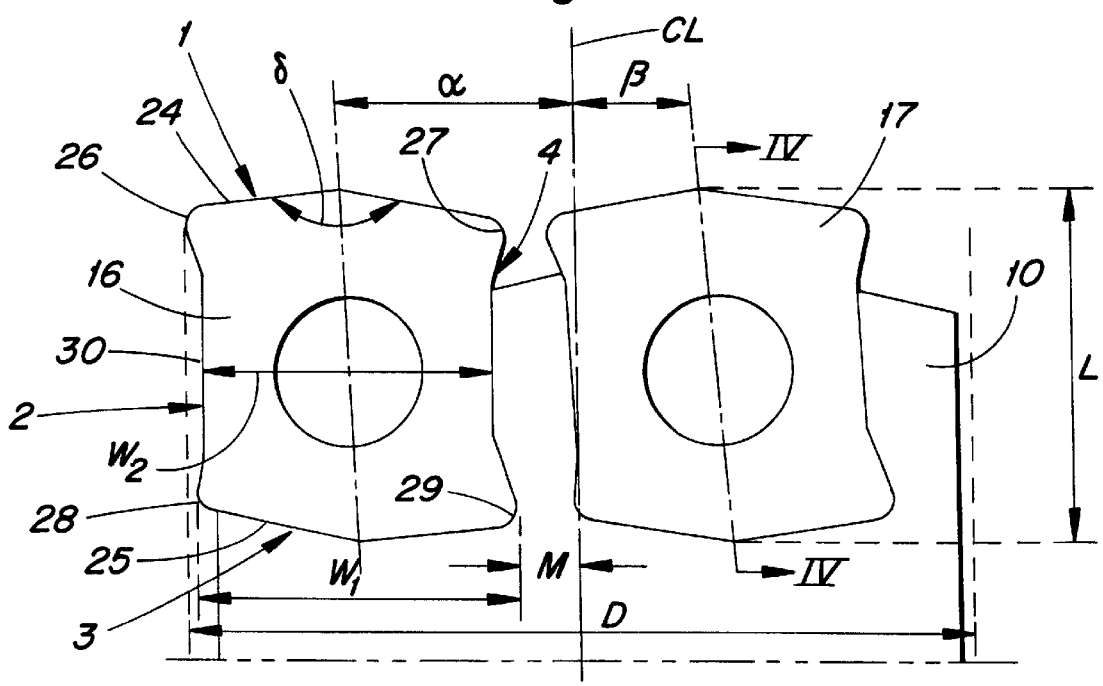
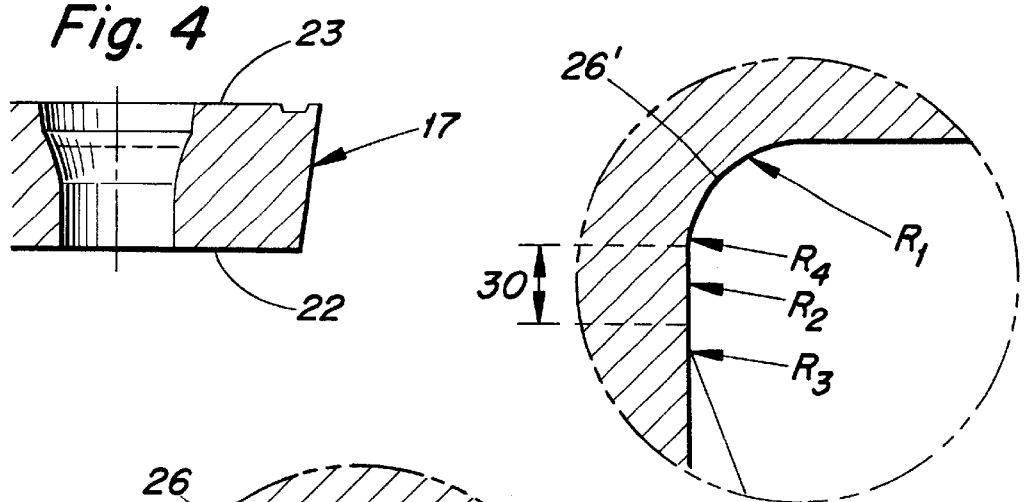
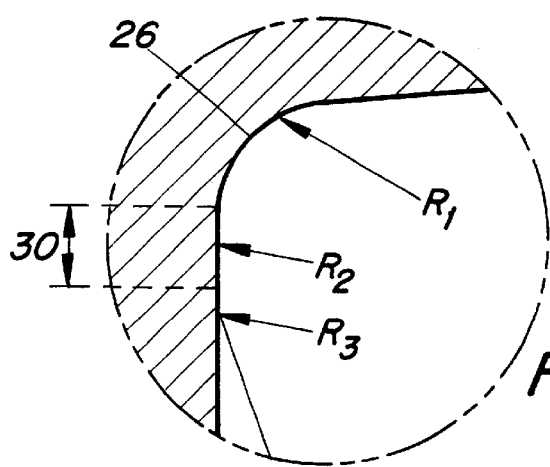

CUTTING INSERT FOR DRILL

This application is a continuation-in-part of International Application No. PCT/SE99/01776 filed on Oct. 5, 1999, which International Application designates the United States and was published by the International Bureau in English Apr. 20, 2000.

BACKGROUND OF THE INVENTION

The present invention relates to a cutting insert for metal drilling. The insert is intended to be secured into a drill body that can be equipped with several identically shaped inserts. The drill body is normally provided with chip flutes, an inner insert site disposed close to the drill center and an outer insert site disposed close to the periphery. This type of drill has cylindrical basic shape defined by a diameter and is rotatable around a central axis.

A drill of this type is disclosed in EP-A-1 81 844 (corresponding to Karlsson et al. U.S. Pat. No. 4,648,760). The inserts therein are basically of rectangular shape where the short end surfaces are confined by two short cutting edges which intersect one another at an obtuse angle, wherein the radially outer insert is located such that it defines the diameter of the drilled hole. The longitudinal axis of the radially inner insert extends parallel with the center axis of the drill whilst overlapping the same.

When providing drills of the aforementioned type it is often difficult to achieve desirable small diameters and at the same time achieve desirable surface finish when drilling in metallic workpieces. Thus, a primary object of the present invention is to provide a new type of cutting insert for drills that enables an improved surface finish to be achieved when drilling in metal. Another object of the present invention is to provide a new type of insert for drills with such optimized geometry that improved "feel" is possible during drilling without simultaneously impaired surface finish of the hole wall in the hole to be drilled.

SUMMARY OF THE INVENTION

These and other objects are achieved by the insert of the present invention, which comprises a body having a polygonal shape with substantially flat upper and lower surfaces, and edge surfaces adjoining the upper and lower surfaces. The lower surface has a smaller area than the upper surface to provide the insert with a positive cutting geometry. A first of the edge surfaces intersects the upper surface to form a main cutting edge. The main cutting edge comprises short cutting edge portions converging from respective ends of the cutting edge and forming an obtuse angle with one another. An end of the first edge surface joins a second one of the edge surfaces by a curved nose portion. The curved nose portion intersects the upper surface to form a curved cutting edge defined by a plurality of sequentially arranged curved cutting edge segments having respective radii. The radii have different respective lengths.

BRIEF DESCRIPTION OF DRAWINGS

The invention will be described in further detail in connection with the following drawings showing preferred embodiments of the invention:

FIG. 3 shows a side view of a drill with inserts as in FIG. 2.

FIG. 4 shows a sectional view along the line IV—IV in FIG. 3.

FIG. 5 shows an enlarged view of a nose portion of a drill insert of the invention.

FIG. 6 shows an enlarged side view of a nose portion of a drill insert according to an alternative embodiment of the invention.

DETAILED DESCRIPTION OF PREFERRED EMBODIMENTS

Figure 1:
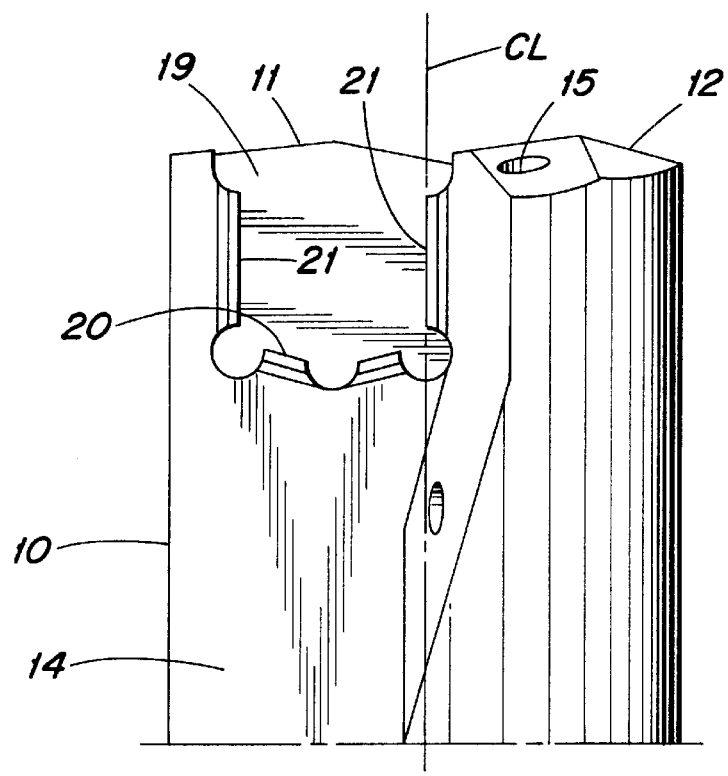
FIG. 1 shows a side view of the cutting portion of a drill shank intended to be equipped with an insert of the invention.
Figure 2:
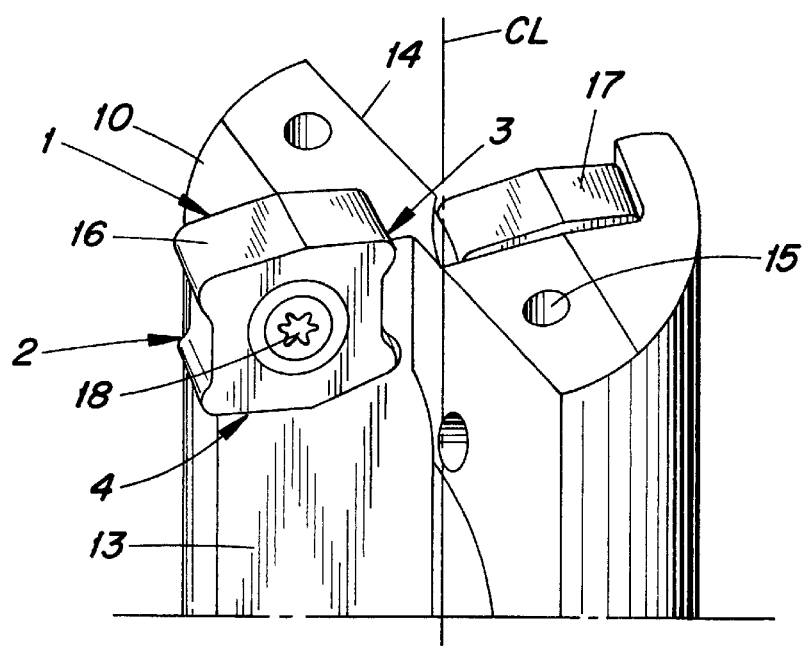
FIG. 2 shows a perspective view of the front portion of a drill equipped with inserts of the invention.

FIGS. 1–3 show a drill comprising a cylindrical drill shaft 10, the front end of which is provided with two radially spaced insert sites 11 and 12 located on respective sides of the center line CL of the drill.

The drill shank 10 has straight or spirally shaped passages 13, 14 for the flow of chips next to respective ones of the insert sites 11, 12. The drill shank 10 also has channels 15 for transporting cooling medium to the front cutting end of the drill.

The insert sites 11, 12 are provided to receive two inserts 16, 17 which are centrally apertured and intended to be secured by a central screw 18 that is threadably engaged in the drill shank 10. One insert 17 is a central (inner) insert and the other is a peripherical (outer) insert 16 obliquely arranged in relation to the center line CL such that it defines the size of the drilled hole. There remains a waist portion M of the shank situated between said outer and inner inserts and having such width that sufficient strength is achieved. The drilling diameter of the drill is defined by diameter D. Each insert site comprises a tangential support surface 19, an axial support surface 20 and a radial support surface 21.

Each insert has polygonal basic shape, in this case a rhomboidal basic shape, with two opposed planar parallel flat lower and upper surfaces 22 and 23, which are joined by four edge surfaces 1, 2, 3, 4 corresponding to short and elongated sides of the rectangle. The lower surface 22 of the insert is smaller than the upper surface 23 such that the insert has a positive clearance angle. The intersection lines between the upper flat surface and the two opposing ones of the end surfaces 1, 4 represent main cutting edges 24, 25, wherein each main cutting edge is angularly broken at an obtuse angle at the middle thereof, said obtuse angle designated δ. Adjacent pairs of the edge surfaces 1–4 are joined to one another by respective curved nose portions which intersect the upper surface 23 to form curved corner cutting edges 26–29. Alternatively, instead of having a four-sided shape, the insert could have so called trigonal shape, i.e. a basically triangular insert with angularly broken edge surfaces. The largest width $W_1$ of the insert is measured across either of the main cutting edges from the tip of one curved cutting edge 26 (or 28) to the other 27 (or 29). A smallest width $W_2$ of the insert is defined by the shortest spacing between the edge surfaces 2 and 4.

As appears from FIG. 3 both the outer insert 16 and the inner insert 17, due to their inclined rhomboidal shape, are inclined in relation to the central axis. The central insert extends axially ahead of the outer insert so as to improve the control of the radial forces such that the intended diameter can be kept. The outer insert 16 is inclined at an angle α and the inner insert at an angle β such that α<β. The insert could, alternatively, have straight rectangular basic shape in accordance with the embodiment described in Swedish Patent 455 676 (corresponding to Karlsson et al. U.S. Pat. No. 4,648, 760), which means that the insert could be considered as consisting of two regular triangles having broken sides whereby two of its corners and one side of said triangle coincide with the cutting edge of the insert and the third corner of each triangle overlap each other with a distance that corresponds with the straight portion of the longitudinal sides of the insert, said distance being 0.4–0.8 mm times the total length L of said insert. In such case the insert obtains an elongated polygonal basic shape such that the upper and lower flat surfaces are joined by two short and two elongated edge surfaces where cutting edges are provided along portions of the intersection lines between the short edge surfaces and the upper flat surface. In that case the short edge surfaces are also broken at the middle of the cutting edges so that each cutting edge appears at an inner obtuse angle α at said broken point.

Figure 5A:
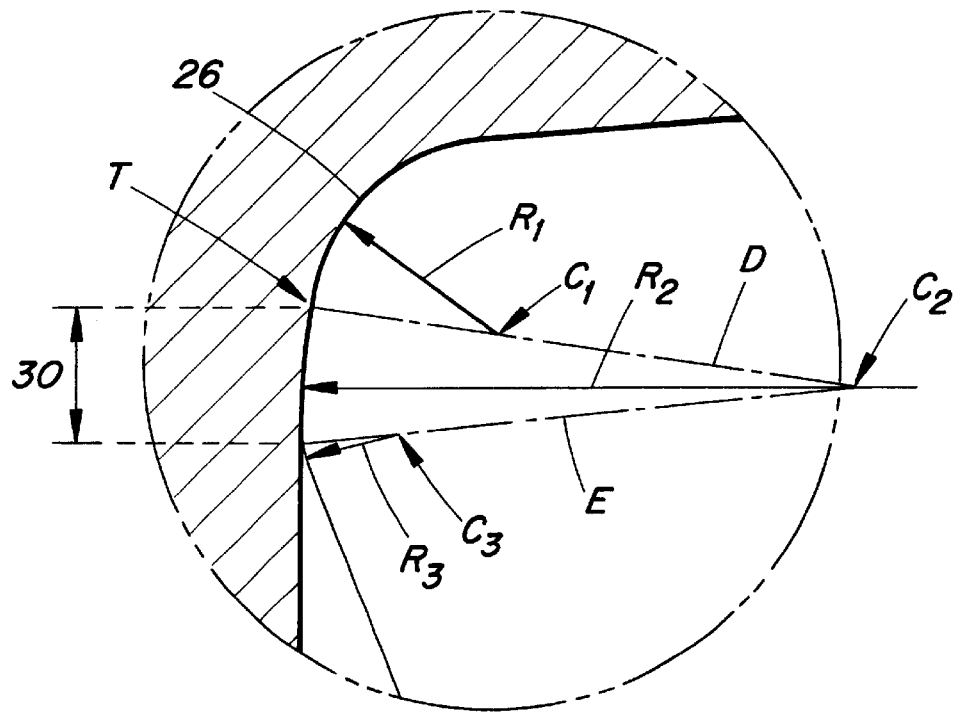
FIG. 5A is an enlarged view of FIG. 5.

In accordance with the invention each corner cutting edge 26, 27 is defined by a plurality of circular segments of radii $R_1$, $R_2$ and $R_3$ as shown in enlarged views in FIGS. 5 and 5A. Adjacent ones of the radii are of different length. In particular, the radius $R_2$ shall always be larger than $R_1$, which contributes to a surface finish improving "wiper" effect along the secondary edge 30. With reference to FIG. 5A, the center $C_2$ of radius $R_2$ lies on a line D which passes through: (i) a terminal end T of the segment defined by the radius $R_1$, and (ii) the center $C_1$ of radius $R_1$. The cutting edge segment defined by the radius $R_2$ extends farther laterally outwardly (i.e., farther to the left in FIG. 5A) than the cutting edge segment defined by radius $R_1$. The insert is positioned in the drill bit to maintain that relationship, i.e., such that the cutting edge segment defined by radius $R_2$ extends farther than the segment defined by the radius $R_1$ in a direction perpendicular to the axis of rotation of the bit. Thus, the cutting edge segment defined by $R_2$ will perform a wiper effect. This applies both during machining by axial drilling forwards into the workpiece as well as during axial displacement of the drill in the opposite (reverse) direction when the drill is being withdrawn from the bore. The radius R3 is somewhat smaller than each of $R_1$ and $R_2$ and its center $C_3$ lies on a line E extending through the center $C_1$ and the terminus of the segment defined by radius $R_2$. When using the idea of the invention on an inclined rhomboidal insert as shown in FIG. 3, the size of radiused edges $R_1$, $R_2$, $R_3$ of diagonally opposed nose portions 26 and 29 that define an outer diameter of the bore when in an active cutting position should be somewhat larger than corresponding radiused edges provided at the other pair of diagonally opposed nose portions 27, 28.

Figure 7:
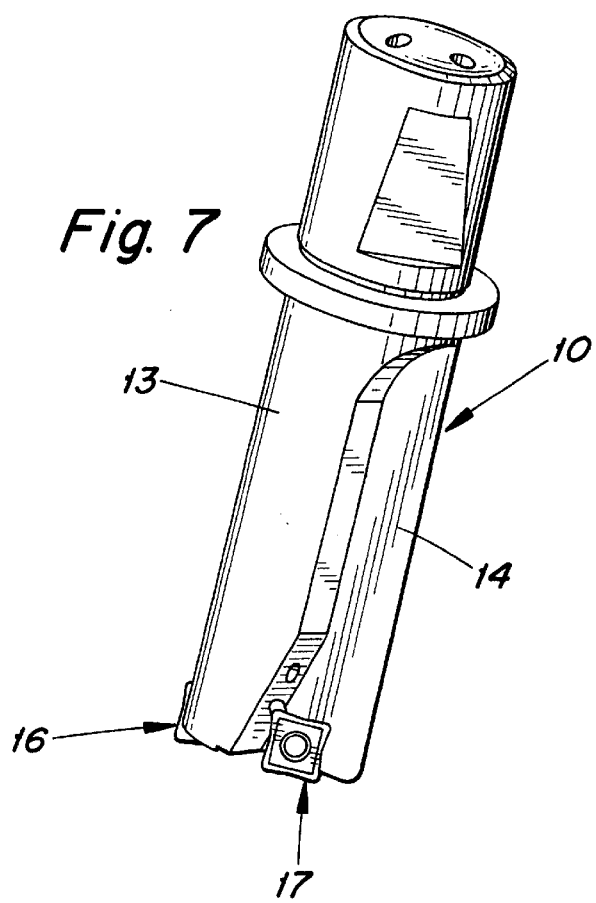
FIG. 7 shows a drill shank with a drill insert according to an alternative embodiment of the invention.
Figure 8:
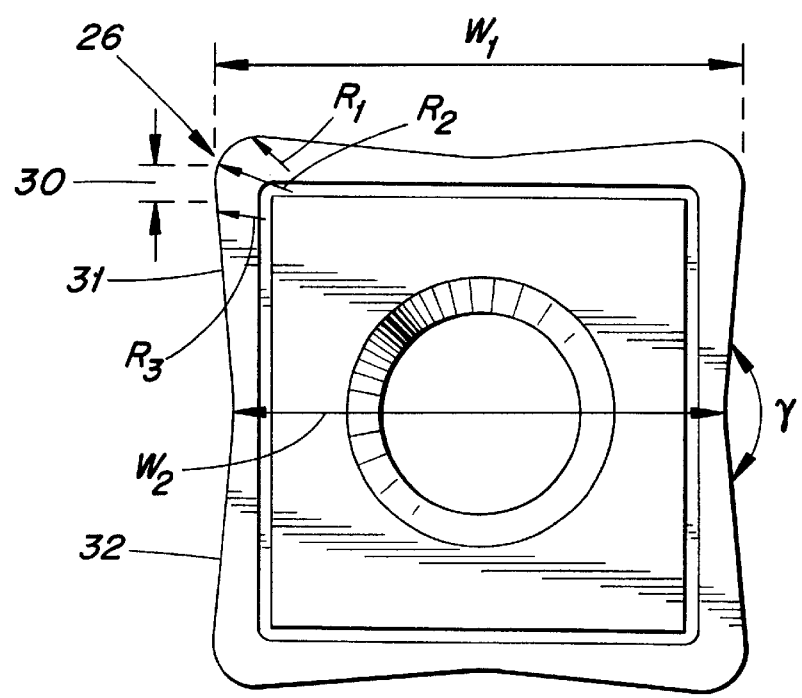
FIG. 8 shows an enlarged plan view of a drill insert according to FIG. 5.

In FIGS. 7–8 are shown an insert and a drill tool equipped with an insert according to an alternative embodiment of the invention. As appears therefrom, the insert has in this case a regular square shape where each curved corner cutting edge transforms into a straight edge surface 31 that is inclined inwards towards the insert which at an obtuse angle γ meets at the middle of the insert with an edge surface 32 that extends straightly from the opposite corner such that a distinguished waist portion is provided on the insert along each of the four edge surfaces. The appearance of the nose radius surface at each corner portion is, in all other aspects, identical with the appearance shown in FIG. 5 comprising a plurality, in this case three circular segments of different radii $R_1$, $R_2$, $R_3$.

In FIG. 6 there is depicted an enlarged portion of an alternative embodiment of the invention where the nose 26' defines a corner cutting edge comprising four different radii circular segments of radii $R_1$, $R_2$, $R_3$ and $R_4$.

Figure 6A:
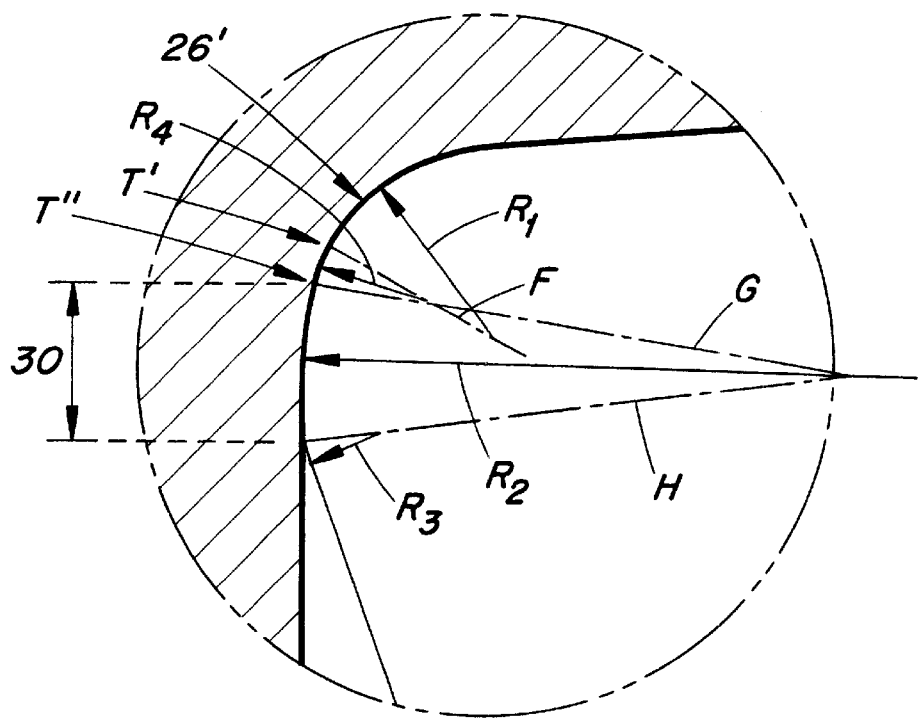
FIG. 6A is an enlarged fragmentary view of FIG. 6.

The radius $R_1$ of the segment located closest to the main cutting edge 24 should be shorter than the radius $R_2$ of secondary edge 30. Further, there should be provided one radiused edge with a radius $R_4$ shorter than the radius $R_1$ and provided between the radii $R_1$ and $R_2$. With reference to FIG. 6A, the center of radius $R_4$ lies on a line F which passes through: (i) a terminal end T' of the segment defined by the radius $R_1$, and (ii) the center of radius $R_1$. Likewise, the center of $R_2$ lies on a line G which passes through; (i) a terminal end T" of the segment defined by the radius $R_4$, and (ii) the center of radius $R_4$. The center of radius $R_3$ lies on a line H which passes through: (i) a terminal end of the segment defined by the radius $R_2$ and (ii) the center of radius $R_2$.

In order to achieve optimized chip control, the radii of the various radiused edges ought to lie in the following ranges:

$R_1$: 0.2–1.6 mm $R_2$: 1.6–10.0 mm $R_3$: 0.1–1.0 mm $R_4$: 0–1.0 mm

As regards radii $R_1$ and $R_2$ the choice of dimensions depends on which drill diameter shall be used. For drills in the diameter range 13–18 mm the radius $R_1$ should amount to 0.2–0.4 mm and $R_2$ should amount to 1.6–4.0 mm. For drills in diameter range 18–58 mm the radius $R_1$ should be 0.4–1.6 mm and radius $R_2$ should then be 2.5–10 mm.

The length of secondary edge segment 30 should have a value in the range 0.1–0.5 mm.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Cutting insert for a rotary drill, comprising a body having a polygonal shape with substantially flat upper and lower surfaces, and edge surfaces adjoining the upper and lower surfaces; the lower surface having a smaller area than the upper surface to provide the insert with a positive cutting geometry; a first of the edge surfaces intersecting the upper surface to form a main cutting edge; the main cutting edge comprising short cutting edge portions converging from respective ends of the cutting edge and forming an obtuse angle with one another; at least one end of the first edge surface joining a second one of the edge surfaces by a curved nose portion; the curved nose portion intersecting the upper surface to form a curved cutting edge defined by a plurality of sequentially arranged curved cutting edge segments having respective radii, the radii being of different respective lengths, wherein a first of the segments is joined to an end of a respective main cutting edge, a second of the segments projecting farther laterally outwardly than the first segment to define a wiper segment, a radius of the second segment being longer than a radius of the first segment.

2. Cutting insert for a rotary drill, comprising a body having a polygonal shape with substantially flat upper and lower surfaces, and edge surfaces adjoining the upper and lower surfaces; the lower surface having a smaller area than the upper surface to provide the insert with a positive cutting geometry; a first of the edge surfaces intersecting the upper surface to form a main cutting edge; the main cutting edge comprising short cutting edge portions converging from respective ends of the cutting edge and forming an obtuse angle with one another; at least one end of the first edge surface joining a second one of the edge surfaces by a curved nose portion; the curved nose portion intersecting the upper surface to form a curved cutting edge defined by a plurality of sequentially arranged curved cutting edge segments having respective radii, the radii being of different respective lengths, wherein a first of the segments joins an end of the main cutting edge; an adjacent one of the segments connected to the first segment and having a larger radius than the first segment, the adjacent segment having a center of its radius lying on a line passing through both a terminal end of the first segment, and the center of the radius of the first segment, wherein the adjacent segment extends farther laterally outwardly than the first segment.

3. Cutting insert for a rotary drill, comprising a body having a polygonal shape with substantially flat upper and lower surfaces, and edge surfaces adjoining the upper and lower surfaces; the lower surface having a smaller area than the upper surface to provide the insert with a positive cutting geometry; a first of the edge surfaces intersecting the upper surface to form a main cutting edge; the main cutting edge comprising short cutting edge portions converging from respective ends of the cutting edge and forming an obtuse angle with one another; at least one end of the first edge surface joining a second one of the edge surfaces by a curved nose portion; the curved nose portion intersecting the upper surface to form a curved cutting edge defined by a plurality of sequentially arranged curved cutting edge segments having respective radii, the radii being of different respective lengths, wherein the plurality of segments comprise at least three segments, a first of the segments joining an end of the main cutting edge, the next two of the segments comprising second and third segments, the second segment defined by a larger radius than the first segment, and the third radius defined by a shorter radius than the first segment, a radius of the second segment lying on a line passing through both a terminal end of the first segment, and a center of the radius of the first segment; the third segment defined by a larger radius than the first segment, a radius of the third segment lying on a line passing through both a terminal end of the second segment, and a center of the second segment, wherein the second and third segments extend farther laterally outwardly than the first segment.

4. Cutting insert for a rotary drill, comprising a body having a polygonal shape with substantially flat upper and lower surfaces, and edge surfaces adjoining the upper and lower surfaces; the lower surface having a smaller area than the upper surface to provide the insert with a positive cutting geometry; a first of the edge surfaces intersecting the upper surface to form a main cutting edge; the main cutting edge comprising short cutting edge portions converging from respective ends of the cutting edge and forming an obtuse angle with one another; at least one end of the first edge surface joining a second one of the edge surfaces by a curved nose portion; the curved nose portion intersecting the upper surface to form a curved cutting edge defined by a plurality of sequentially arranged curved cutting edge segments having respective radii, the radii being of different respective lengths, wherein the short cutting edge portions converge in a direction away from a center of the body.

5. Cutting insert for a rotary drill, comprising a body having a polygonal shape with substantially flat upper and lower surfaces, and edge surfaces adjoining the upper and lower surfaces; the lower surface having a smaller area than the upper surface to provide the insert with a positive cutting geometry; a first of the edge surfaces intersecting the upper surface to form a main cutting edge; the main cutting edge comprising short cutting edge portions converging from respective ends of the cutting edge and forming an obtuse angle with one another; at least one end of the first edge surface joining a second one of the edge surfaces by a curved nose portion; the curved nose portion intersecting the upper surface to form a curved cutting edge defined by a plurality of sequentially arranged curved cutting edge segments having respective radii, the radii being of different respective lengths, wherein the main cutting edge comprises a first main cutting edge, the upper surface being generally rectangular and including a second main cutting edge situated opposite the first main cutting edge and being configured identically thereto, wherein the insert is indexible, wherein there are two pairs of diagonally opposed identically configured nose portions, the nose portions of one pair being larger than the nose portions of the other pair.

6. The insert according to claim 1, wherein the short cutting edge portions converge in a direction toward a center of the body.

7. Cutting insert for a rotary drill, comprising a body having a polygonal shape with substantially flat upper and lower surfaces, and edge surfaces adjoining the upper and lower surfaces; the lower surface having a smaller area than the upper surface to provide the insert with a positive cutting geometry; a first of the edge surfaces intersecting the upper surface to form a main cutting edge; the main cutting edge comprising short cutting edge portions converging from respective ends of the cutting edge and forming an obtuse angle with one another; at least one end of the first edge surface joining a second one of the edge surfaces by a curved nose portion; the curved nose portion intersecting the upper surface to form a curved cutting edge defined by a plurality of sequentially arranged curved cutting edge segments having respective radii, the radii being of different respective lengths, wherein the main cutting edge comprises a first main cutting edge, the upper surface being generally rectangular and including a second main cutting edge situated opposite the first main cutting edge and being configured identically thereto, wherein the insert is indexible, wherein the obtuse angle constitutes a first obtuse angle, there being two pairs of diagonally opposed identically configured nose portions, the upper surface being generally square and including third and fourth opposing main cutting edges each connecting a nose portion of the first main cutting edge with a nose portion of the second main cutting edge, each of the third and fourth main cutting edges including two short cutting edge portions converging in a direction toward a center of the body and forming a second obtuse angle, a first distance separating respective apexes of the second obtuse angles from each other defining a shortest dimension of the upper surface.

8. The insert according to claim 1 wherein the second segment adjoins an end of the first segment.

9. The insert according to claim 1 wherein another of the segments interconnects an end of the first segment with an end of the second segment, and has a smaller radius than the first radius.

10. A rotary drill bit comprising:

a shaft defining a longitudinal axis of rotation, and a longitudinal front end; and a cutting insert mounted at the front end and comprising:
a body having a polygonal shape with substantially flat upper and lower surfaces, and edge surfaces adjoining the upper and lower surfaces;

the lower surface having a smaller area than the upper surface to provide the insert with a positive cutting geometry; a first of the edge surfaces intersecting the upper surface to form a main cutting edge;

the main cutting edge comprising short cutting edge portions converging from respective end of the cutting edge and forming an obtuse angle with one another; at least one ends of the first edge surface joining a second one of the edge surfaces by a curved nose portion; the curved nose portion intersecting the upper surface to form a curved cutting edge defined by a plurality of sequentially arranged curved cutting edge segments having respective radii, the radii of adjacent ones of the segments being of different respective lengths, wherein a first of the segments joints an end of a first of the short cutting edge portions, a second of the segments projecting farther laterally outwardly from the axis of rotation than the first segment to define a wiper segment, a radius of the wiper segment being longer than a radius of the first segment.

* * * * *